(12) United States Patent
Veeramreddi et al.

(10) Patent No.: US 8,487,598 B2
(45) Date of Patent: Jul. 16, 2013

(54) DC-DC CONVERTER WITH UNITY-GAIN FEEDBACK AMPLIFIER DRIVING BIAS TRANSISTOR

(75) Inventors: Srinivas Venkata Veeramreddi, Hyderabad (IN); Murugesh Prashanth Subramaniam, Chennai (IN); Harikrishna Parthasarathy, Chennai (IN)

(73) Assignee: Texas Instruments Incorporated, Dallas, TX (US)

( * ) Notice: Subject to any disclaimer, the term of this patent is extended or adjusted under 35 U.S.C. 154(b) by 224 days.

(21) Appl. No.: 12/870,868

(22) Filed: Aug. 30, 2010

(65) Prior Publication Data

US 2012/0049815 A1    Mar. 1, 2012

(51) Int. Cl.
*G05F 1/56*    (2006.01)
*G05F 1/563*    (2006.01)
*G05F 1/565*    (2006.01)

(52) U.S. Cl.
USPC .......................... 323/282; 323/271; 323/285

(58) Field of Classification Search
USPC ......... 323/266–268, 271, 273–275, 277–278, 323/282–286, 315
See application file for complete search history.

(56) References Cited

U.S. PATENT DOCUMENTS

| | | | |
|---|---|---|---|
| 6,107,844 A * | 8/2000 | Berg et al. | 327/110 |
| 6,333,623 B1 * | 12/2001 | Heisley et al. | 323/280 |
| 6,381,159 B2 * | 4/2002 | Oknaian et al. | 363/98 |
| 6,744,322 B1 | 6/2004 | Ma et al. | |
| 6,859,372 B2 | 2/2005 | Xu et al. | |
| 7,710,093 B2 * | 5/2010 | Dwarakanath et al. | 323/282 |
| 7,928,712 B1 * | 4/2011 | Levesque et al. | 323/282 |
| 7,928,713 B2 * | 4/2011 | Nguyen | 323/282 |
| 7,982,446 B2 * | 7/2011 | Noon et al. | 323/285 |
| 8,193,798 B1 * | 6/2012 | Pace et al. | 323/284 |
| 2008/0084197 A1 * | 4/2008 | Williams et al. | 323/282 |
| 2008/0129269 A1 * | 6/2008 | Rozsypal et al. | 323/288 |
| 2008/0191679 A1 | 8/2008 | Williams | |
| 2010/0079127 A1 * | 4/2010 | Grant | 323/285 |
| 2011/0032027 A1 | 2/2011 | Dash et al. | |

FOREIGN PATENT DOCUMENTS

JP    11089249 A    3/1999

* cited by examiner

*Primary Examiner* — Adolf Berhane
*Assistant Examiner* — Nusrat Quddus
(74) *Attorney, Agent, or Firm* — Lawrence J. Bassuk; W. James Brady; Frederick J. Telecky, Jr.

(57) ABSTRACT

An output stage of a switching DC-DC converter includes a pair of transistors and a bias transistor connected between the transistors. A voltage regulator generates a bias voltage to bias a control terminal of the bias transistor with a fixed bias voltage. The voltage regulator is operable in a full-power mode and a low-power mode. The voltage regulator consumes larger current in the full-power mode than in the low-power mode. At low load currents, the voltage regulator is operated in the low-power mode when both the transistors in the pair of transistors are off, and in the full-power mode otherwise.

6 Claims, 2 Drawing Sheets

US 8,487,598 B2

DC-DC CONVERTER WITH UNITY-GAIN FEEDBACK AMPLIFIER DRIVING BIAS TRANSISTOR

BACKGROUND

1. Technical Field

Embodiments of the present disclosure relate generally to power supply circuits, and more specifically to a DC-DC converter with improved efficiency at low load currents.

2. Related Art

A DC-DC converter is a circuit that generates a regulated direct current (DC) output voltage from a power source such as, for example, an unregulated DC input voltage. A regulated output voltage generally refers to a constant-value output voltage despite changes in the value of the current drawn (within a range) from the converter. The regulated DC output voltage of a DC-DC converter may be used as a power supply for powering electronic circuits, the electronic circuits thus constituting a load(s) and drawing a load current from the DC-DC converter. DC-DC converters may include linear as well as switching converters. A switching (or switch-mode) DC-DC converter generally refers to a converter that employs transistors operated to be switched ON and OFF to generate the desired output DC voltage from the input DC voltage. A switching DC-DC converter may employ a smoothing circuit (e.g., filters, using inductors and capacitors) to obtain a constant value DC voltage from a pulsed/switching output voltage generated by the switching operation of the transistors. Linear converters refer to DC-DC converters in which the resistance of a transistor operated in the linear region is controlled to generate a desired output DC voltage from an input DC voltage.

Efficiency of a DC-DC converter is generally the ratio of the total output power delivered to a load (or loads) powered by the output of the DC-DC converter and the total power consumed by the DC-DC converter in delivering the output power, and may be specified, for example, as a percentage. The efficiency of a DC-DC converter may be poorer (smaller) at low load currents than at relatively higher load currents. For example, one or more circuit portions or functional blocks of a mobile phone may be powered-down when the mobile phone is not being used to process voice calls and/or when other utilities and applications provided by the mobile phones are not being used. In such a scenario, the load current drawn by the mobile phone from a DC-DC converter used to supply power to the mobile phone may be termed to be 'low' compared to, for example, when the mobile phone is being used to make voice calls.

SUMMARY

This Summary is provided to comply with 37 C.F.R. §1.73, requiring a summary of the invention briefly indicating the nature and substance of the invention. It is submitted with the understanding that it will not be used to interpret or limit the scope or meaning of the claims.

An output stage of a DC-DC converter includes a first transistor and a second transistor. The ON and OFF durations of each of the first transistor and the second transistor are controlled to cause generation of a regulated DC voltage on an output node of the DC-DC converter. The regulated DC voltage is generated within a tolerance range between an upper limit and a lower limit. The output stage further includes a bias transistor coupled between the first transistor and the second transistor, with a current terminal of the bias transistor being coupled to the output node. A voltage regulator biases the bias transistor at a fixed bias voltage. The voltage regulator is operable in one of a first mode and a second mode. The voltage regulator consumes a larger current in the first mode than in the second mode. If the current drawn from the output node is below a low-current threshold and the regulated DC voltage has a value between the upper limit and the lower limit, the voltage regulator is operated in the second mode, the voltage regulator being operated in the first mode otherwise.

Several embodiments of the present disclosure are described below with reference to examples for illustration. It should be understood that numerous specific details, relationships, and methods are set forth to provide a full understanding of the embodiments. One skilled in the relevant art, however, will readily recognize that the techniques can be practiced without one or more of the specific details, or with other methods, etc.

BRIEF DESCRIPTION OF THE VIEWS OF DRAWINGS

Example embodiments of the present disclosure will be described with reference to the accompanying drawings briefly described below.

The drawing in which an element first appears is indicated by the leftmost digit(s) in the corresponding reference number.

DETAILED DESCRIPTION

Various embodiments are described below with several examples for illustration.

1. Example Device

Figure 1:
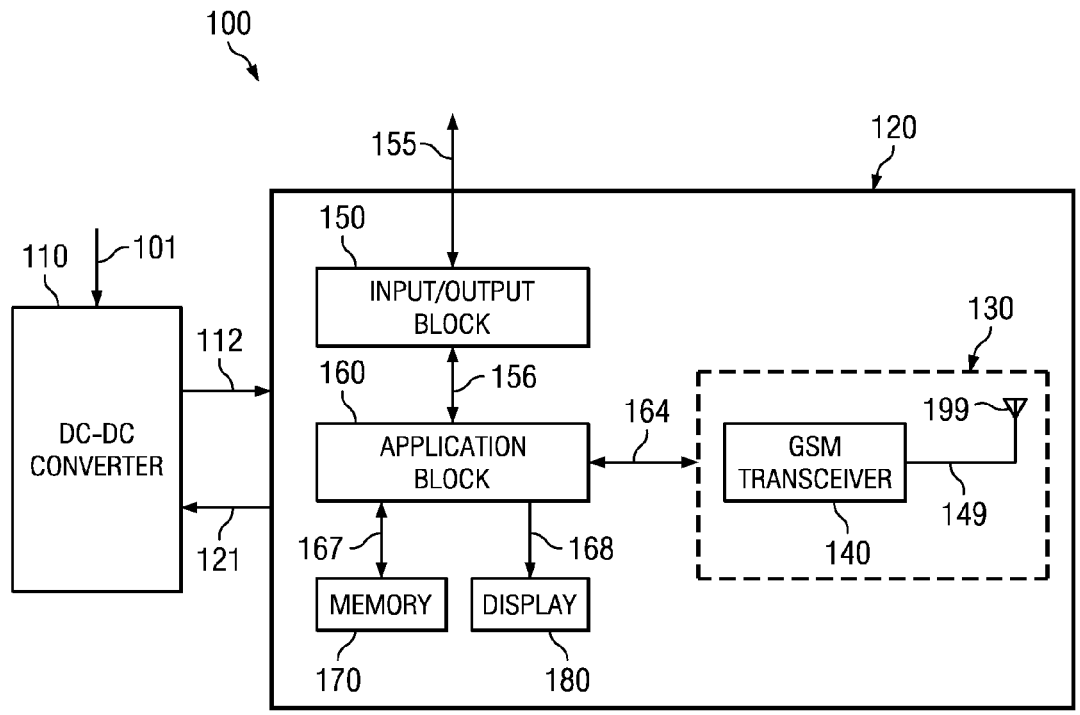
FIG. 1 is a block diagram of an example device in which several embodiments of the present disclosure can be implemented.

FIG. 1 is a block diagram of an example device in which several embodiments of the present disclosure can be implemented. The diagram shows mobile phone 100, which is in turn shown containing switching DC-DC converter 110 (referred to also as converter 110 below for conciseness) and communication block 120. Communication block 120 is shown containing GSM (Global System for Mobile Communication) block 130, application block 160, memory 170, display 180 and input/output (I/O) block 150. The components/blocks of mobile phone 100 in FIG. 1 are shown merely by way of illustration. However, mobile phone 100 may contain more or fewer components/blocks, and may be implemented according to other technologies as well. For example, mobile phone 100 may be implemented according to code division multiple access (CDMA) technology instead of GSM technology. Further, techniques for reducing power consumption in DC-DC converters described below can be applied in other devices and in other environments as well.

The blocks of FIG. 1 may be implemented either as separate integrated circuits (IC), or all implemented within a same IC. Typically, antenna 199 (as well as one or more of components such as filters, assumed to be contained within block 130) of FIG. 1 may be mounted on a printed circuit board (PCB), with corresponding PCB trace(s) providing the electrical connectivity represented by path 149. Further, while the techniques below are described in the context of a switching converter, the techniques can be extended to linear regulators as well.

Converter 110 represents a switching converter, and operates to generate a regulated DC voltage on path 112 from an unregulated DC voltage received from a power source, such as a battery, on path 101. The regulated DC voltage on path 112 supplies power for the operation of the components and blocks of communication block 120. The DC voltage level on path 101 is generally different from the DC voltage level on path 112. In an embodiment, voltage on path 112 is less than power supply voltage 101, converter 110 being a buck regulator. However, in other embodiments, converter 110 may be implemented as a boost regulator as well, with output voltage 112 being greater than power supply voltage 101. Converter 110 may receive a signal on path 121 from communication block 120, with the signal specifying if communication block 120 is in a standby (low-power mode) or not.

Communication block 120 receives the regulated DC voltage on path 112. The regulated DC voltage is used as a power supply for the operation of the internal blocks and components of communication block 120.

GSM block 130 is shown containing GSM transceiver 140 and transmit antenna 199. GSM block 130 may contain a receive antenna and filters as well, but are not shown in FIG. 1. GSM block 130 operates to provide wireless telephone operations, with GSM transceiver 140 containing receiver and transmitter sections to perform the corresponding receive and transmit functions.

Input/output (I/O) block 150 provides a user with the facility to provide inputs via path 155, for example, to dial numbers. In addition, I/O block 150 may provide outputs received from application block 160 also on path 155. Such outputs may include data, voice, images etc. I/O block 150 communicates with application block 160 via path 156.

Application block 160 may contain corresponding hardware circuitry (e.g., processors), and operates to provide various user applications provided by mobile phone 100. The user applications may include voice call operations, data transfers, providing positioning information, etc. Application block 160 may operate in conjunction with I/O block 150 to provide such features. Application block 160 generates signal 121 based on a determination of whether GSM block 130 and/or other blocks (including some or all portions of application block 160) in communication block 120 are in a low-power mode (e.g., standby mode) or not. Application block 160 may make such determination in a known way. For example, GSM transceiver 130 may set a bit in a register (readable via path 164) specifying whether GSM transceiver 130 is in a power-down mode.

Display 180 displays image frames and user-provided input in response to the corresponding display signals received from application block 160 on path 168. The images frames may be generated by a camera provided in mobile phone 100, but not shown in FIG. 1. Display 180 may contain memory (frame buffer) internally for temporary storage of pixel values for image-refresh purposes, and may be implemented, for example, as a liquid crystal display screen with associated control circuits.

Memory 170 stores program (instructions) and/or data (provided via path 167) used by applications block 160, and may be implemented as RAM, ROM, flash, etc, and thus contains volatile as well as non-volatile storage elements, and represents a computer (or a machine) readable medium.

One or more blocks of mobile phone 100 (specifically those contained in communication block 120) may be powered-down when the corresponding feature is not being used. For example, portions of GSM transceiver 140 may be set to low-power or power-down mode when voice calls are not being transmitted and received. In such a scenario, the load current drawn by communication block 120 from DC-DC converter is lower than otherwise.

2. DC-DC Converter

Figure 2:
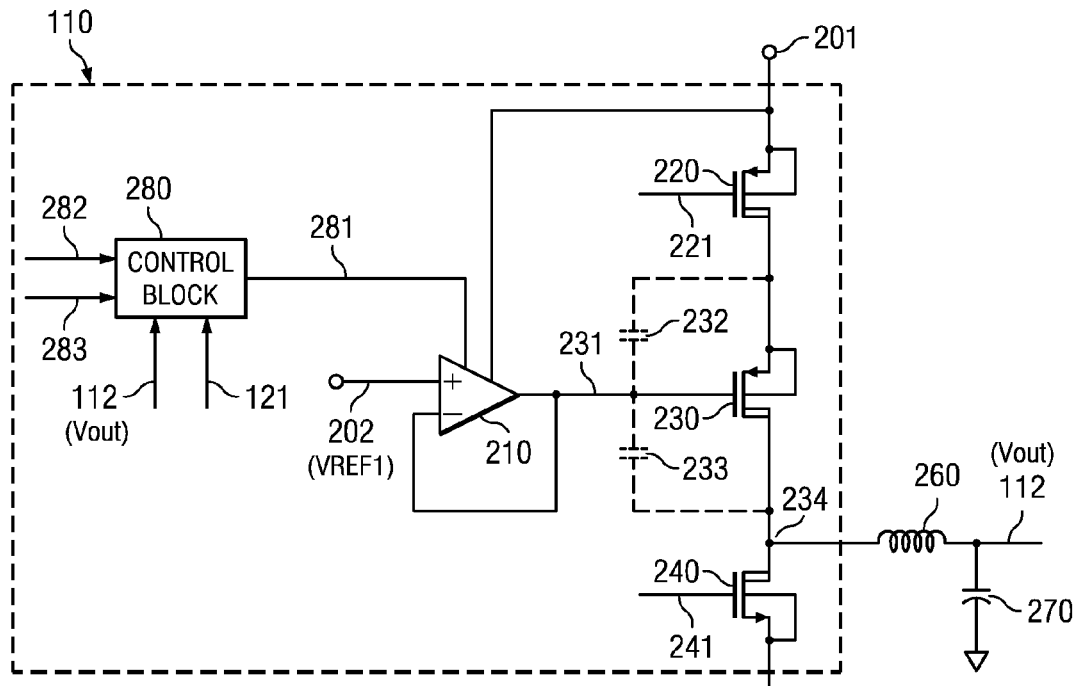
FIG. 2 is a diagram illustrating the details of an output stage of DC-DC converter, in an embodiment.

FIG. 2 is a diagram illustrating the details of the output stage of converter 110, in an embodiment. The output stage is shown containing P-type MOS (PMOS) transistor 220, N-type MOS (NMOS) transistor 240, bias transistor 230, amplifier 210, and control block 280. Inductor 260 and capacitor 270 form an LC filter and smoothen the waveform at node 234 to generate a DC voltage at output node 112 (Vout), which is the regulated DC power supply voltage generated by converter 110. Vout 112 may be generated to have a value within a tolerance range specified by an upper limit (Vu) and a lower limit (Vl). Each of transistors 220, 230 and 240 may be implemented as a drain-enhanced MOS transistor.

In an embodiment, converter 110 is implemented in integrated circuit (IC) form, while inductor 260 and capacitor 270 are implemented as discrete components, external to converter 110. However, in alternative embodiments, inductor 260 and capacitor 270 may also be integrated on-chip, i.e., within IC 110. Converter 110 may include various other components and blocks required for its operation, but not shown in FIG. 2 for conciseness. Terminals 201 and 299 represent power supply and ground terminals respectively. The power supply received on terminal 201 may be the same as, or be derived from, the power supply received on terminal 101 of FIG. 1.

Each of transistors 220 (first transistor) and 240 (second transistor) is operated as a switch, and receives corresponding switching waveforms from a pulse generation block, not shown in FIG. 2. Switching waveforms provided on paths 221 and 241 are substantially the same, but are generated to ensure that ON-intervals of transistors 220 and 240 do not overlap. The duration (pulse-width) and/or frequency of the pulses of the switching waveforms provided on paths 221 and 241 may be modulated by the pulse generation block, according to the specific technique employed (pulse-width modulation or pulse-frequency modulation) to enable generation of a desired value of voltage at node (output node) 112 (Vout). The pulse generation block may receive voltages indicative of the output voltage (on output node 112) to adjust the pulse-width or pulse frequency of signals provided on nodes 221 and 241 to provide (and maintain) the output 112 (Vout) at the desired voltage level. The pulse generation block may also operate to limit the current drawn (by a load, not shown) from output node 112, thereby providing output current-limiting.

Transistors 220, 240 and 230 may be implemented as drain-enhanced power MOSFETS, and using low-voltage technologies in ultra-deep sub-micron (UDSM) CMOS processes. The power supply voltage (power source) received on path 201 may be of a value (greater than a safe threshold value) that may result in transistor 220 being subjected to voltage stresses beyond a safe limit, if bias transistor 230 were not used. In the absence of bias transistor 230, transistor 220 would be directly connected in series with transistor 240 in a CMOS inverter configuration. The use of a power supply voltage 201 exceeding the safe threshold value may cause terminal pairs (gate-to-source, drain-to-source, etc) to be subjected to voltages in excess of the safe limit. To further illustrate with an example, assuming bias transistor 230 were not present and connected as shown in FIG. 2, and power supply voltage 201 has a value of 3.6 volts, the voltage across the gate and source terminals of transistor 220 can have a value of 1.8. The voltage across gate and drain terminals of transistor 220, when transistor 220 is OFF and transistor 240 is ON will be 3.6V. Such reliability problems may be of even greater concern if voltage 201 is higher, such as for example, 4.8V.

Bias transistor 230 is connected in series between transistors 220 and 240, and prevents transistor 220 from being subjected to voltages beyond the safe limit. The gate terminal 231 of bias transistor 230 is maintained (ideally) at a constant bias voltage (Vpb) throughout the operation of converter 110. Amplifier 210, shown implemented as a unity-gain feedback amplifier, receives a constant reference voltage 202 (VREF1) on its non-inverting input terminal, and generates the constant bias voltage Vpb on path 231. Although, shown as a unity-gain feedback amplifier, component 210 may be implemented using other approaches, and may generally be viewed as a voltage regulator operating to maintain the bias voltage on path 231 at a constant level. In an embodiment, a low-dropout voltage regulator (LDO) is implemented in place of amplifier 210. Voltage regulator (LDO) 210 receives a power supply for operation from terminal 201.

Figure 3:
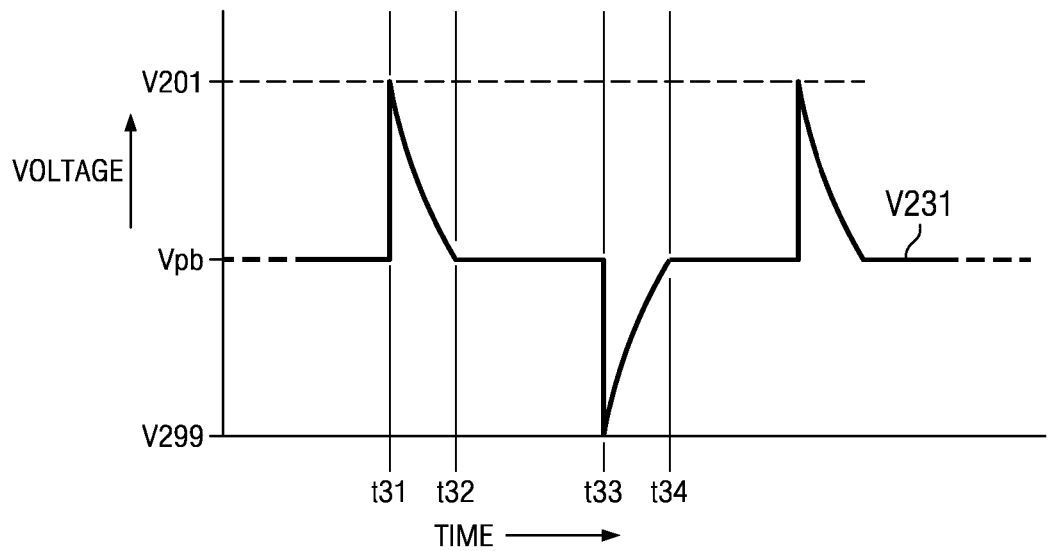
FIG. 3 is a diagram showing the variations in a bias voltage provided to bias a transistor used in an output stage of a DC-DC converter, in an embodiment.

Parasitic capacitances 232 and 233 that may be present between gate and source terminals, and gate and drain terminals respectively of bias transistor 230 may cause bias voltage V231 to vary with respect to time as shown in FIG. 3. In FIG. 3, t31 represents a time instance at which transistor 220 is switched-ON, transistor 240 being switched-OFF slightly before transistor 220 is switched ON The presence of parasitic capacitance 232 causes voltage (noted as V231 in FIG. 3) at the gate terminal of bias transistor 230 to rise to the power supply voltage V201 provided on path 201. Voltage regulator 210 operates to reduce V231 back to Vpb, and V231 settles back to Vpb at t32. The interval t31 to t32 thus represents a transient on gate terminal 231 during which V231 is not at the constant level Vpb. Similarly, t33 represents a time instance at which transistor 240 is switched-ON, transistor 220 being switched-OFF slightly before turning ON transistor 240. Parasitic capacitance 233 causes V231 to reduce to ground potential (V299). Voltage regulator operates to increase V231 back to Vpb, and V231 settles back to Vpb at t34. Interval t33 to t34 also represents a transient on gate terminal 231 during which V231 is not at the ideally constant level Vpb.

Deviations at node 231 from Vpb may increase the ON-resistance of bias transistor 230, and result in increased power dissipation in transistor 230, thereby reducing the efficiency of converter 110. The deviations may also adversely affect the reliability of transistors 220 and 230 (the reliability of transistor 230 being affected if the value of V231 goes very low) due to the changed bias conditions of bias transistor 230 during the transients. Hence, it is generally desirable to maintain V231 constant at Vpb, or at least enable quick recovery from deviations from Vpb (i.e., to reduce the duration of intervals t31-t32 and t33-t34). Therefore, voltage regulator 210 is implemented as a high-bandwidth (wide-band) regulator to enable such quick recovery, or to maintain V231 constant at Vpb (fixed bias voltage).

One potential consequence of the implementation of voltage regulator 210 as a high-bandwidth component is that the current drawn from power supply 201 may be relatively high. In particular, the current drawn from power supply 201, and thus the additional power consumed by converter 110, may reduce the efficiency of converter 110 to unacceptable levels at low load currents. As an example illustration, assuming that voltage 112 is 1.8V, V201 is 3.6V, current (Ipb) drawn by voltage regulator 210 is 200 micro Amperes (μA), and load current (Iload) drawn by a load from output 112 (Vout) is 100 μA, and ignoring losses in converter 110 due to other effects, efficiency of converter 110 equals 25%.

When load current Iload is less than a 'low-current' threshold, switches 220 and 240 may need to be operated (to be ON and OFF by the corresponding switching waveforms, as noted above) only intermittently. The specific value of the low-current threshold may vary based on the deployment environment and other considerations. Referring to FIG. 1, the 'low-current' threshold may correspond to the current drawn by block 120 from converter 110 (via path 112) when one or more of blocks 130, 150, 160, 170, and 180 is powered-down. For example, when mobile phone 100 is not being used to process voice calls, block 130 may be powered down, and the current drawn from converter 110 may be lesser than a corresponding low-current threshold.

Figure 4:
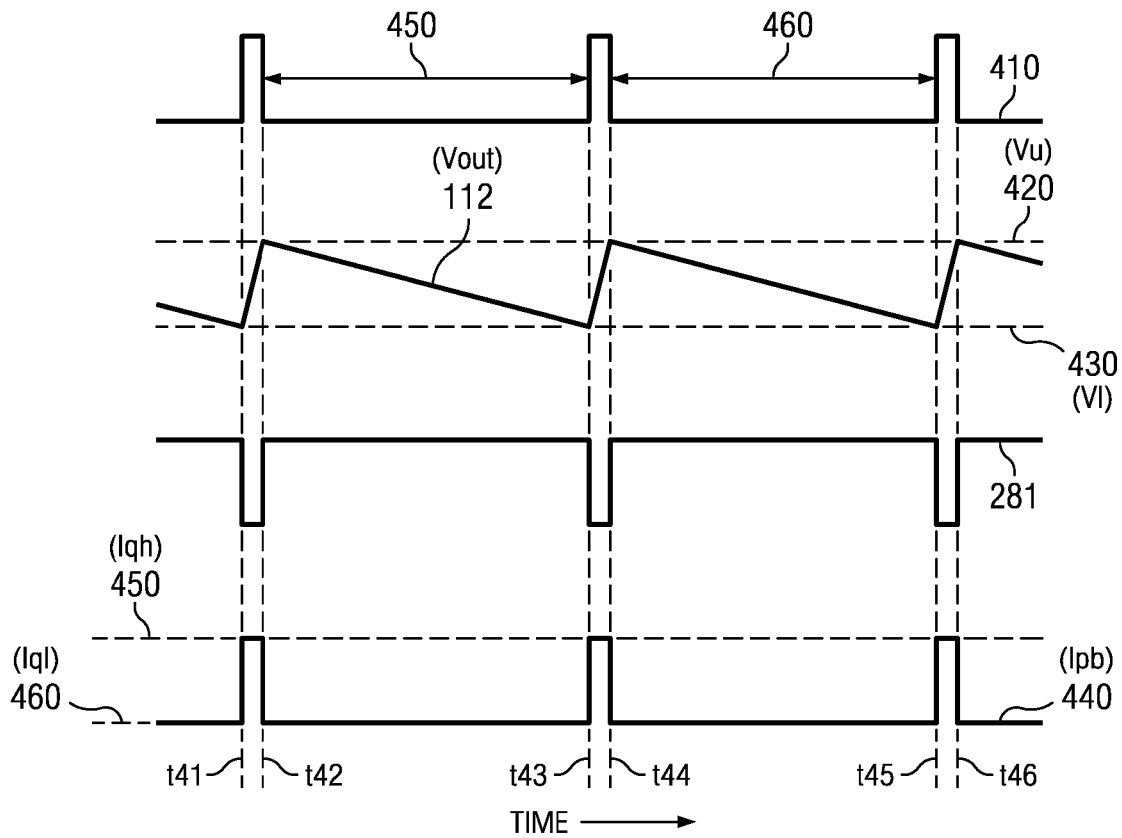
FIG. 4 is a diagram illustrating operational states of some of the components as well as the current and voltage waveforms at some nodes of an output stage of a DC-DC converter, in an embodiment.

In durations (e.g., 450 (t42 to t43) in FIG. 4) when switches 220 and 240 are OFF (termed non-switching intervals), voltage regulator 210 is set to a low-current (and hence low-power) mode, as illustrated with respect to the waveforms of FIG. 4. FIG. 4 shows operational states of some of the components as well as the current and voltage waveforms at some nodes of converter 110, when Iload is below the low-current threshold. Waveform 410 represents the operational states of switches 220 and 240 when Iload is below the low-current threshold. Voltage levels 420 (Vu) and 430 (Vl) respectively represent upper and lower limits within which voltage 112 (Vout) is allowed to vary. The range Vu-Vl thus represents a tolerance range with which voltage 112 (Vout) is provided. Waveform 440 represents the magnitudes of the current (Ipb) drawn by voltage regulator 210.

In intervals t41 to t42, t43 to t44 and t45 to t46, switches 220 and 240 are operated to be ON and OFF, similar to the manner in which they may be operated normally. However, both of switches 220 and 240 are maintained in an OFF state (i.e., switched OFF for the entire duration) in non-switching intervals 450 (t42 to t43) and 460 (t44 to t45). Voltage 112 (Vout) is shown as reducing from the upper limit (Vu) to the lower limit (Vl) in each of intervals 450 and 460 shown in FIG. 2. In intervals t41 to t42, t43 to t44 and t45 to t46 (switching intervals), voltage 112 (Vout) rises to Vu.

Voltage regulator 210 is implemented with the ability to source & sink current, and to operate in one of a full-power mode and a low-power mode. In the full-power mode, voltage regulator 210 draws high current from power supply 201 to enable operation as a wideband component. In the low-power mode, voltage regulator 210 draws relatively lesser current from power supply 201 than in the full-power mode. In each of the full-power mode and the low-power mode, voltage regulator generates bias voltage Vpb on path 231.

In non-switching intervals 450 and 460, voltage regulator 210 is operated in the low-power mode, and consequently current 440 (Ipb) is low (460 (Iql)). In switching intervals (t41 to t42, t43 to t44 and t45 to t46), voltage regulator 210 is operated in the full-power mode and current 440 (Ipb) is relatively larger (value indicated by 450 (Iqh)) than in the lower-power mode (value indicated by 460 (Iql)), as illustrated by waveform 440 in FIG. 4.

In an embodiment, control block 280 contains a comparator that senses if output voltage 112 (Vout) has reached the high threshold Vu. Output voltage 112 level equaling Vu indicates that both of switches 220 and 240 will both be switched OFF. The output of the comparator is used to set regulator 210 to a low power mode. Control block 280 receives voltage values representing the upper limit (Vu) on path 282 and the lower limit (Vl) on path 283. The values on paths 282 and 283 may be generated, for example, by voltage references (not shown), or using a voltage divider network.

Control block 280 also receives voltage 112 (Vout). On path 121, control block 280 receives a signal from application block 160 (FIG. 1) indicating whether Iload is less than the low-current threshold or not. Signal 121 may be generated as described above with respect to FIG. 1. Control block 280 generates a signal (control output) on path 281, which is provided as an input to voltage regulator 210. One logic value of signal 281 sets voltage regulator 210 in a low-power (low-current consumption) mode, and the other logic value sets voltage regulator 210 in (normal) full-power mode.

If signal 121 (first signal) indicates that Iload is less than the low-current threshold, control block 280 compares the value of voltage 112 (Vout) with upper limit (Vu) and lower limit (Vl). If voltage 112 is less than the lower limit (Vl), control block 280 sets signal 281 to the logic level (referred to for convenience as the full-power logic level) that sets voltage regulator 210 to the full-power mode. Control block 210 maintains signal 281 in the full-power logic level till voltage 112 (Vout) equals the upper limit (Vu). Once voltage 112 (Vout) equals Vu, control block sets signal 281 to the logic level (referred to for convenience as the low-power logic level) that sets voltage regulator 210 to the low-power mode. Control block 210 maintains signal 281 in the low-power logic level till voltage 112 (Vout) equals (or drops below) the lower limit (Vl) due to Iload, and the control block 210 continues to set signal 281 to the appropriate level till Iload increases to a value equal to or greater than the low-current threshold. Capacitor 270 provides Iload in the non-switching intervals.

In FIG. 4, the low-power logic level of signal 281 is shown as logic high, and the full-power logic level is shown as logic low. At t41, 112 (Vout) equals Vl, and control block 280 sets signal 281 to logic low, thereby enabling voltage regulator 210 to operate with full-power. At t42, 112 (Vout) equals Vu, and control block 280 sets signal 281 to logic high, thereby enabling voltage regulator 210 to operate in the low-power mode. Similarly, signal 281 is shown as being logic low in intervals t43-t44 and t45-t46, and as logic high in intervals t42-t43 and t44-t45. Waveform 440 shows the values of Ipb in each of the corresponding time intervals. Current level 450 (Iqh) represents the current (Ipb) drawn in the full-power mode, while current level 460(Iql) represents the current (Ipb) drawn in the low-power mode. The average value of Ipb is specified by the equation below:

$$Iavg=[(Iqh*Tsw)+(Iql*Tnsw)]/[(Tsw+Tnsw)] \quad \text{Equation 1}$$

wherein,

Iavg represents the average current,

Tsw represents the duration of a switching interval, and

Tnsw represents the duration of a non-switching interval. Assuming that the non-switching intervals are much longer than the switching intervals, Iavg approximately equals Iql. The reduction in the average value of Ipb results in reduced power consumption in voltage regulator 210, and thereby improves efficiency of converter 110 when Iload is less than the low-current threshold.

Whether load is greater than (or equal to) the low-current threshold or less than the low-current threshold may be determined in any of several other well-known ways as well. One technique, as already noted above, may be based on an output signal (e.g., signal 121 of FIG. 1) generated by a circuit (e.g., application block 160 of FIG. 1) that is powered by converter 110, with the output signal indicating whether Iload is less than the low-current threshold or not. According to another technique, a low-valued resistor (implemented for example, as a metal resistor) can be connected between power supply terminal 201 and the source terminal of transistor 220, and the voltage drop across the resistor can be provided as an input to control block 280, the voltage drop across the low-valued resistor being representative of the load current Iload.

According to yet another technique, a current mirror circuit can be implemented to minor the current flowing through transistor 220, the mirrored current generated by the current mirror circuit being indicative of the load current Iload. Such current mirror would be implemented with its gate and source terminals connected respectively to the gate and source terminals of transistor 220, and can be implemented in a known way.

With converter 110 implemented as described above, battery power (assuming power source 101 of FIG. 1 is provided by a battery) of mobile phone 100 may be conserved, and the need to frequently recharge the battery may be reduced.

In the illustrations of FIGS. 1 and 2, although terminals/nodes are shown with direct connections to various other terminals, it should be appreciated that additional components (as suited for the specific environment) may also be present in the path, and accordingly the connections may be viewed as being electrically coupled to the same connected terminals.

It should be appreciated that the specific type of transistors (such as NMOS, PMOS, etc.) noted above are merely by way of illustration. However, alternative embodiments using different configurations and transistors will be apparent to one skilled in the relevant arts by reading the disclosure provided herein. For example, NMOS transistors and PMOS transistors may be swapped, while also interchanging the connections to power and ground terminals. Accordingly, in the instant application, the power and ground terminals are referred to as constant reference potentials, the source (emitter) and drain (collector) terminals (through which a current path is provided when turned ON and an open path is provided when turned OFF) of transistors are termed as current terminals, and the gate (base) terminal is termed as a control terminal.

While various embodiments of the present disclosure have been described above, it should be understood that they have been presented by way of example only, and not limitation. Thus, the breadth and scope of the present disclosure should not be limited by any of the above-described embodiments, but should be defined only in accordance with the following claims and their equivalents.

What is claimed is:

1. An integrated circuit DC-DC voltage converter comprising:
   A. a DC power supply lead and a ground lead;
   B. an output lead;
   C. a first transistor, a second transistor, and a bias transistor connected in series between the power supply lead and the ground lead, the bias transistor being connected between the first transistor and the second transistor, and the output lead being connected between the bias transistor and the second transistor, the transistors each having a control lead, the control leads of the first and second transistors each receiving switching signals to turn the first and second transistors on and off to generate a desired DC voltage between an upper limit and a lower limit on the output lead; and
   D. a unity-gain feedback amplifier having one input coupled to a reference voltage, another input, and an output, the other input is connected to the output, and the output is connected to the control lead of the bias transistor.

2. The converter of claim 1 in which the first transistor and the second transistor are a drain-enhanced power Metal Oxide Semiconductor Field Effect Transistors (MOSFET), and are implemented using low-voltage technologies in ultra-deep sub-micron (UDSM) CMOS processes.

3. The converter of claim 1 including a capacitor and an inductor connected to the output lead external of the integrated circuit.

4. The converter of claim 1 in which the reference voltage is connected to a non-inverting input terminal and the output is connected to an inverting input terminal.

5. The converter of claim 1 in which the amplifier has a control input, and including a control block having an upper limit input, a lower limit input, an input connected to the output lead, a low power input, and a control output connected to the control input of the amplifier.

6. The converter of claim 4 including a communications block having an input connected to the output lead and an output coupled to the bias transistor through the amplifier.

* * * * *